No. 734,866. Patented July 28, 1903.

UNITED STATES PATENT OFFICE.

EDUARD HEPP, OF FRANKFORT-ON-THE-MAIN, AND CHRISTOPH HARTMANN, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

BLUE ANTHRAQUINONE DYE AND PROCESS OF MAKING SAME.

SPECIFICATION forming part of Letters Patent No. 734,866, dated July 28, 1903.

Application filed May 2, 1903. Serial No. 155,408. (No specimens.)

*To all whom it may concern:*

Be it known that we, EDUARD HEPP, Ph. D., residing at Frankfort-on-the-Main, and CHRISTOPH HARTMANN, Ph. D., residing at Höchst-on-the-Main, Germany, both citizens of the Empire of Germany, have invented certain new and useful Improvements in the Manufacture of Dyestuffs of the Anthracene Series, of which the following is a specification.

It is known by Letters Patent No. 666,594 that if brom-alpha-amidoanthraquinone monosulfo-acid be condensed with paratoluidin a coloring-matter is obtained which dyes chrome-mordanted or unmordanted wool violet shades. This coloring-matter has the characteristic property of being insoluble in an aqueous solution containing an excess of carbonate of soda or of caustic soda. It is also known by the above-cited Letters Patent that instead of brominated alpha-amido-anthraquinone monosulfo-acid the corresponding beta derivative can be employed or a mixture of the alpha and beta derivatives. By "alpha and beta amidoanthraquinone" sulfo-acids are evidently meant the acids which were first so designated by Claus (*Ber. d. d. Chem. Ges.* 15, page 1514) and prepared by reducing the products of nitration of the anthraquinone meta-sulfo-acid. These sulfo-acids were proved by being transformed into the corresponding dioxyanthraquinones to be 1:6 and 1:7 derivatives having the following formulæ:

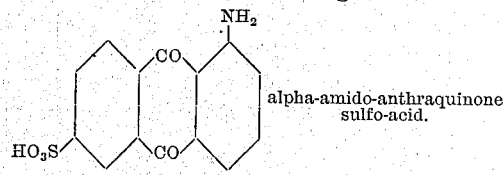
alpha-amido-anthraquinone sulfo-acid.

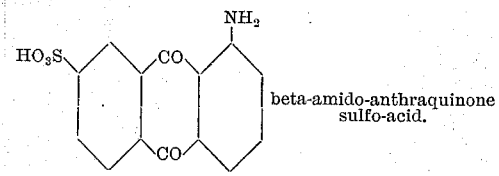
beta-amido-anthraquinone sulfo-acid.

We have found that by nitrating the anthraquinone ortho-sulfo-acid and then reducing the products thus obtained two new amidoanthraquinone sulfo-acids are obtained, being transformed in the usual manner into anthrarufin and chrysazin and having, therefore, the formulæ:

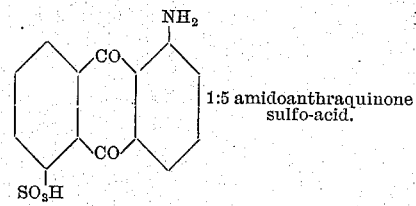
1:5 amidoanthraquinone sulfo-acid.

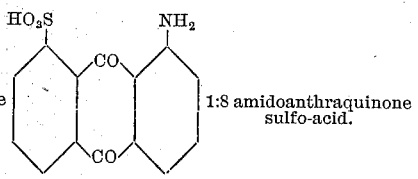
1:8 amidoanthraquinone sulfo-acid.

These amidoanthraquinone sulfo-acids when treated with halogens and then condensed with primary aromatic amins give new blue coloring-matters, being monosulfo-acids, which become very valuable if they are afterward sulfonated, and thus transformed into polysulfo-acids. The latter dye wool very pure blue shades and are also characterized by the property of being soluble in water in presence of an excess of carbonate of soda or of caustic soda.

Our invention may be carried out, for instance, as follows: Ten parts, by weight, of bromamidoanthraquinone sulfo-acid (obtained by treating amidoanthraquinone sulfo-acid 1:5 with bromin) are mixed with one hundred parts of paratoluidin and the mixture is heated for about six hours to a temperature of 140° to 150° centigrade. The melt is then allowed to cool to about 70° centigrade and poured into dilute hydrochloric acid. The sulfo-acid separates out and is filtered. It is transformed into sodium salt by boiling with a solution of carbonate of soda. The sodium salt thus obtained is filtered and dried. To obtain the sodium salt of the polysulfo-acids, ten parts of the sodium salt of monosulfo-acid are dissolved in one hundred parts of fuming sulfuric acid containing three per cent. of $SO_3$ and the mixture is allowed to stand for some hours at a temperature of about 20° centigrade until a test portion of it diluted with water gives a precipitate of a sulfo-acid which is easily soluble in carbonate of soda. The melt is then poured into water. The coloring-matter is precipitated by common salt and dried.

Similar coloring-matters are produced if for paratoluidin anilin or other primary aromatic amins are used and the products obtained subsequently sulfonated. Also for brominated amidoanthraquinone sulfo-acid 1:5 the corresponding 1:8 derivative can be employed or a mixture of the 1:5 and 1:8 derivative.

The new coloring-matter dyes unmordanted and chrome-mordanted wool fast blue shades. When dry and pulverized, it is a dark-blue powder very easily soluble in water, giving blue solutions easily precipitated by common salt, but not by an excess of carbonate of soda or of caustic soda. It dissolves in concentrated sulfuric acid with a feeble bluish tint, the color of the solution changing into red by the addition of a small quantity of ice, while a larger quantity of ice produces a violet solution and separates out a blue precipitate. By the addition of hydrochloric acid to the watery solution the color of the latter turns violet, and by the addition of ammonia to this solution the original blue color is again produced.

Having now described our invention, what we claim is—

1. The process for producing new anthraquinone dyestuffs, which consists in transforming the condensation products obtained by heating halogenized amidoanthraquinone sulfo-acids with an aromatic amin into polysulfo-acids by the action of sulfonating agents, substantially as hereinbefore described.

2. The process for producing a new anthraquinone dyestuff, which consists in transforming the condensation product obtained by heating brominated amidoanthraquinone sulfo-acid 1:5 with paratoluidin into polysulfo-acids by the action of feeble fuming sulfuric acid, substantially as hereinbefore described.

3. The herein-described new anthraquinone dyestuffs obtainable by sulfonating condensation products from halogenized amidoanthraquinone sulfo-acids with aromatic amins, which dyestuffs when dry and pulverized are dark powders easily soluble in water with a blue color and also soluble in presence of an excess of carbonate of soda or of caustic soda, dyeing unmordanted and chrome-mordanted wool fast blue shades.

4. The herein-described specific new anthraquinone dyestuff obtainable by sulfonating the condensation product of brominated amidoanthraquinone sulfo-acid 1:5 with paratoluidin, being when dry and pulverized a dark-blue powder easily soluble in water, giving thus blue solutions which are easily precipitated by common salt, but not by an excess of carbonate of soda or of caustic soda, the solution turning violet by the addition of hydrochloric acid and assuming if neutralized with ammonia the original blue color, soluble in concentrated sulfuric acid, yielding solutions showing a feeble bluish tint, the color of which turns first red and then violet by adding ice, a bluish precipitate being separated out, dyeing unmordanted and chrome-mordanted wool fast blue shades.

In testimony that we claim the foregoing as our invention we have signed our names in presence of two subscribing witnesses.

EDUARD HEPP.
  CHRISTOPH HARTMANN.

Witnesses:
 ALFRED BRISBOIS,
 JOSEPH FLACH.